Jan. 11, 1966 P. W. ALLEN 3,228,186
COMBINATION SELF-RESTRAINING NOZZLE AND EXIT CONE
FOR SOLID PROPELLANT ROCKET MOTORS
Filed Aug. 27, 1962 4 Sheets-Sheet 1

INVENTOR
PHILLIP W. ALLEN

INVENTOR
PHILLIP W. ALLEN

INVENTOR
PHILLIP W. ALLEN

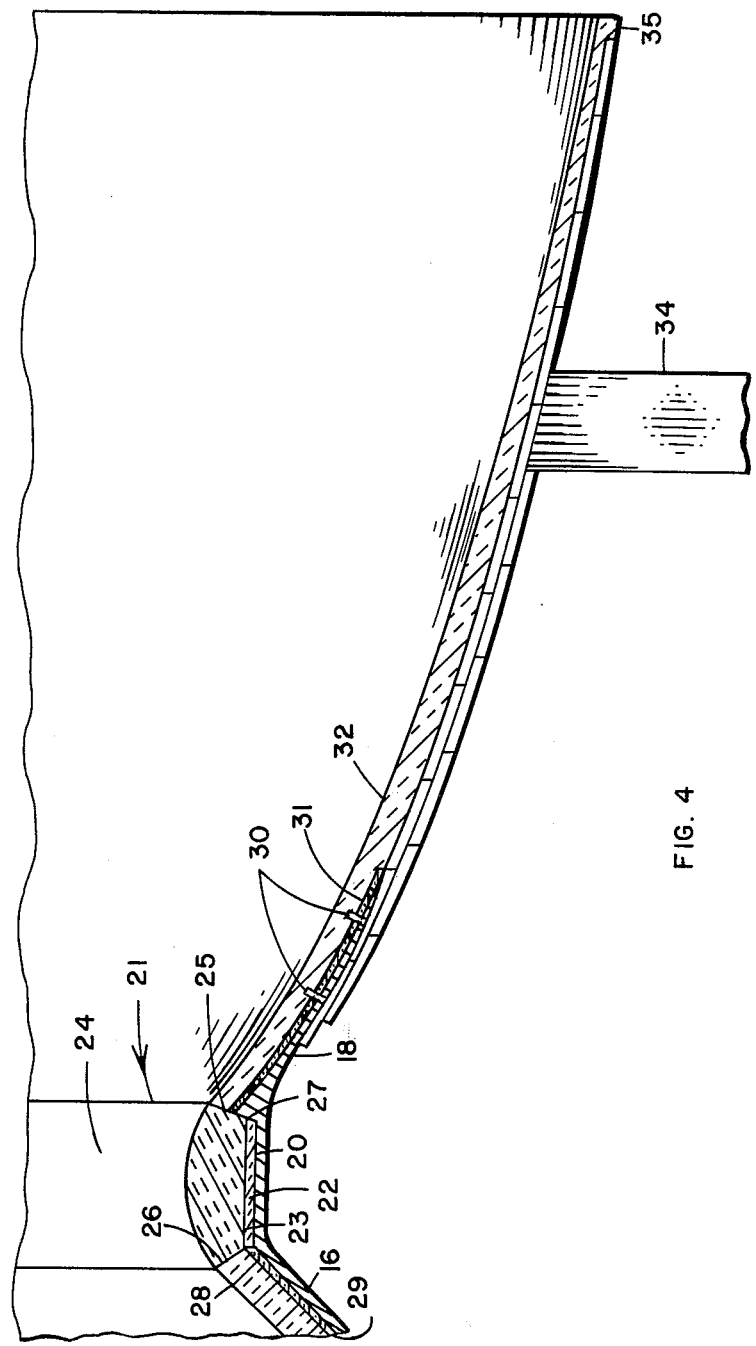

United States Patent Office 3,228,186
Patented Jan. 11, 1966

3,228,186
COMBINATION SELF-RESTRAINING NOZZLE AND EXIT CONE FOR SOLID PROPELLANT ROCKET MOTORS
Phillip W. Allen, Huntsville, Ala., assignor to Thiokol Chemical Corporation, Bristol, Pa., a corporation of Delaware
Filed Aug. 27, 1962, Ser. No. 220,127
1 Claim. (Cl. 60—35.6)

This invention relates to solid propellant rocket motors and more particularly to a self-restraining nozzle for use with such motors.

The emphasis on most recent military requirements for solid propellant rocket motors has been applied to reduced weight, simplicity of construction, low cost and dependability. One area of solid propellant rocket motors particularly subject to improvement under these prerequisites is the attachment of the exhaust nozzle to the motor case. The nozzle is commonly attached to the exterior of the motor case by means of bolted flanges or a similar means. Obviously, the weight of both the motor case and the nozzle assembly must be increased by the material in the flanges. Further, precision fitting of the flanges and the use of a multitude of bolts is required to ensure proper sealing. The present invention was conceived with the idea of reducing the complexity and weight of attaching an exhaust to a rocket motor case.

The present invention further simplifies rocket motor manufacture by permitting both the forward and the aft insulation to be made and inserted into the rocket motor case as unitary elements. The insulation can be observed during and after the insertion thereof and can be more readily inspected by visual, mechanical, or radiographic methods. The aft insulation is adhered directly to the nozzle assembly and becomes an integral part of sealing the nozzle and motor case joint.

One of the many objects and advantages of the invention is the elimination of the flange to flange coupling of the nozzle and motor case and the plurality of fastening means required to provide a strong and gas-tight seal.

Another of the many objects or advantages is the accessibility for inspecting the solid propellant that has been cast in the rocket motor case and thus more readily determine the condition of the cast propellant before the exhaust portion of the self-restraining nozzle is placed in position in contact with the exhaust portion receiving section of the nozzle.

Still another of the many objects and advantages of the invention is the simplicity and efficiency of the manner of the installation of the self-restraining nozzle and the dependability thereof.

With the above and other objects and advantages in view, the invention consists of the novel details of construction, arrangement and combination of parts more fully hereafter described, claimed and illustrated in the accompanying drawings in which:

FIGURE 4 is a view similar to FIGURE 3 showing another form of outer shell or covering as it is applied to the exhaust portion of the self-restraining nozzle.

Figure 1:
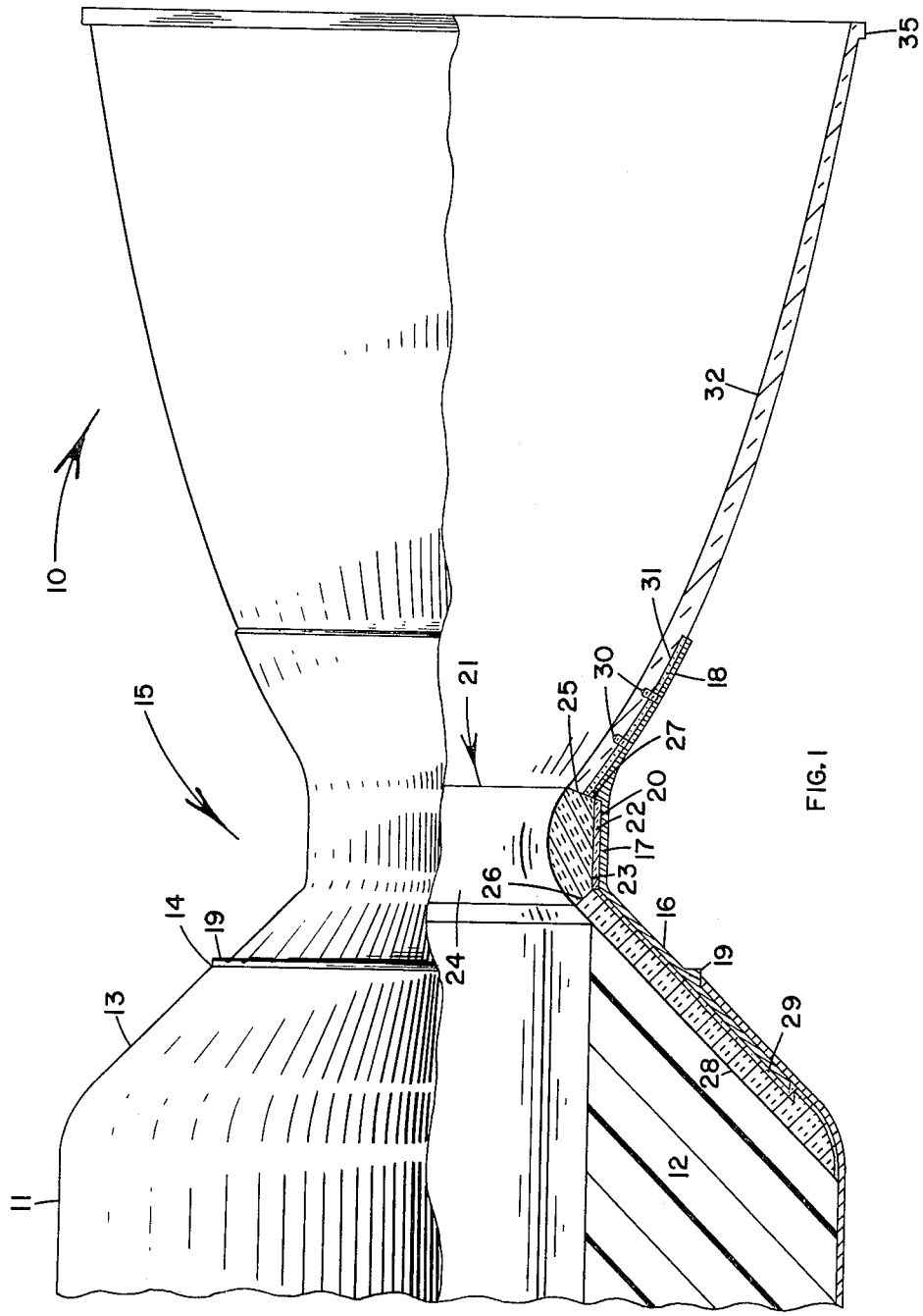
FIGURE 1 is an elevational view partly in section of the aft end of a solid propellant rocket motor with the self-restraining nozzle in position and before the outer shell or covering has been applied to the exhaust portion of the self-restraining nozzle.
Figure 2:
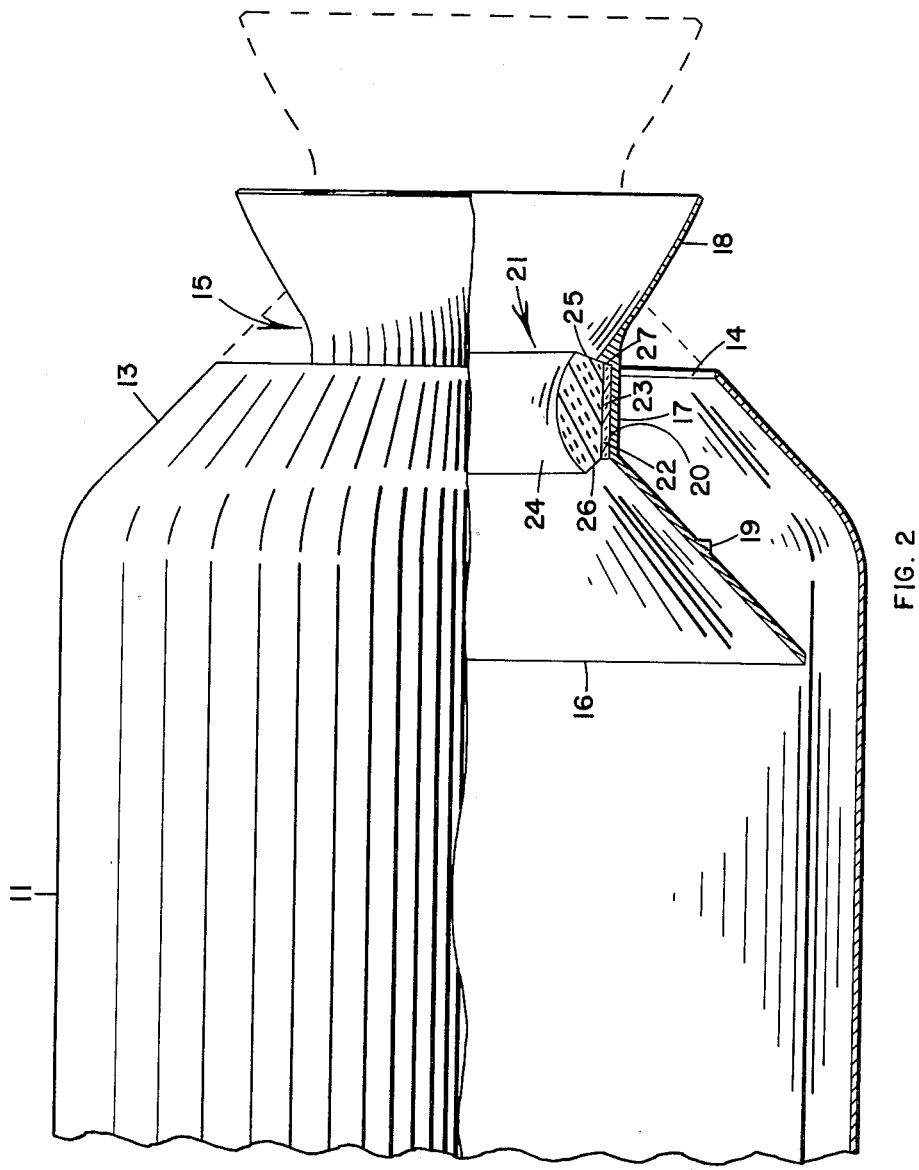
FIGURE 2 is an elevational view partly in section of the aft end of a rocket motor case showing the manner in which the self-restraining nozzle is inserted into operational position in the rocket motor case.

Referring more in detail to the drawings in which like parts are designated by like reference numerals, the reference numeral 10 is used to designate the self-restraining nozzle embodying the invention.

In order to properly illustrate the invention and its manner of use, there is shown in FIGURE 1 a portion of the aft end of a solid propellant rocket motor case 11 having a portion of a solid propellant charge 12 cast therein. The rocket motor case 11 is of generally cylindrical formation and may be of any desired size. At the aft end thereof the cylindrical section of the rocket motor case 11 merges into a truncated conical portion 13 having a central opening 14 therein that is of the proper size to have operational engagement with a self-restraining nozzle 15.

The self-restraining nozzle 15 is of generally hour-glass shaped formation having a conical skirt section 16, a throat section 17 and a slightly curved substantially conical exhaust portion receiving section 18. The outer surface of the conical skirt section 16 is contoured to closely match the inner surface of the truncated conical portion 13 of the rocket motor case 11. The outer surface of the skirt section 16 is also provided with an annular aligning shoulder 19 which engages with the peripheral edge of the opening 14 when the nozzle 15 is in position. The throat section 17 has an annular inner seat portion 20 into which a throat insert 21 is bonded with an insulating potting material 22. The throat insert 21 which may be made of the conventional materials commonly used, is in the form of a generally cylindrical ring having a flat outer surface 23 which engages the seat portion 20 and a curved inner surface 24 which defines the throat of the nozzle 15 and is exposed to the combustion products of the burning solid propellant charge 12. The throat insert 21 also has two side faces 25 and 26 oriented at obtuse angles to the flat outer surface 23 of the throat insert 21. The side face 25 of the throat insert 21 engages in abutting relation with one peripheral edge of a generally truncated conical aft case insulation 28 which is bonded to the truncated conical portion 13 of the rocket motor case 11 and the skirt section 16 of the nozzle 15 by means of an insulating potting material 29, as shown in FIGURE 1.

The solid propellant charge 12 is then cast in the rocket motor case 11 and after the solid propellant charge 12 has been cured it will firmly retain the nozzle 15 in position. As the solid propellant charge 12 is consumed, internal pressure resulting from the combustion of the solid propellant charge 12 will serve to retain the nozzle 15 in position.

After the solid propellant charge 12 has been cured a plurality of retaining pins 30 are mounted in the exhaust portion receiving section 18 and a potting material 31 is applied to the inner surface thereof. A layer of insulation 32 of the shape of an exhaust portion is then inserted into the exhaust portion receiving section 18 and is retained therein by means of the retaining pins 30 and potting material 31.

Figure 3:
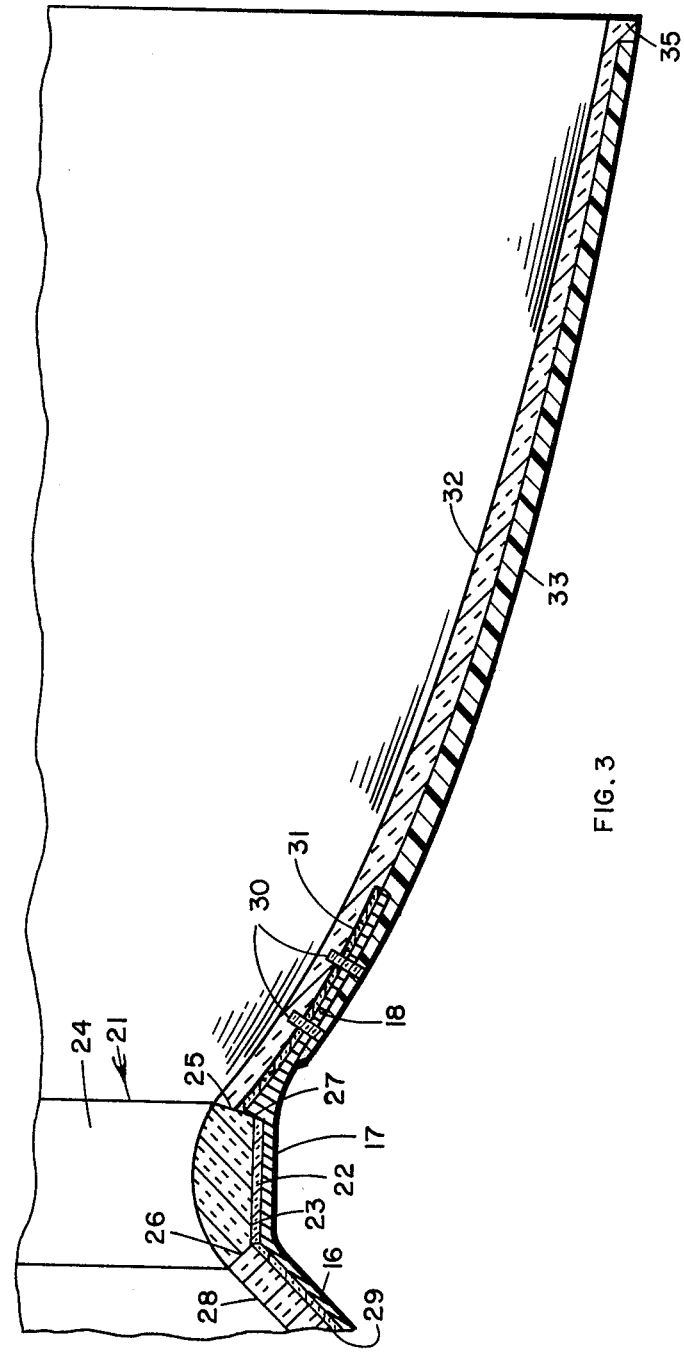
FIGURE 3 is a view of a part of the exhaust portion of the self-restraining nozzle in section showing one form of outer shell or covering as it is applied to the exhaust portion of the self-restraining nozzle.

A laminated plastic outer shell 33 as shown in FIGURE 3 may then be applied to the outer surface of the insulation 32 or strands or strips of glass rovings 34 may be wound onto the insulation 32 as shown in FIGURE 4. The insulation 32 has an annular shoulder 35 on the peripheral edge thereof which engages and retains in place the outer shell or covering as it is applied either as shown in FIGURE 3 or FIGURE 4.

The essential features of this invention lie in the structures of the solid propellant rocket motor case 11, the nozzle 15, and insulation 32 and the method of assembling these structures to form a solid propellant rocket motor having a self-restraining nozzle 10.

The solid propellant rocket motor case 11 differs from the conventional type in that there is no aft closure joint and may or may not be closed at the head end. The insulation 32 is basically the same as in usual designs except that it is inserted into the conical exhaust portion receiving section 18 until it is in abutting relation with the throat insert 21. As in usual designs, it is molded in a substantially truncated conical shape.

The big difference in the solid propellant rocket motor case 11 resulting from the use of the self-restraining nozzle 10 is that it comprises three basic parts, the insulation 32, the outer shell or covering 33 or 34, and the nozzle 15. The insulation 32 and outer shell or covering 33 or 34 are assembled onto the nozzle 15 after it is in place in the rocket motor case 11. The nozzle 15 is itself an assembly of three elements; the nozzle 15 that is one continuous piece, throat insert 21 and insulation 28 retaining the nozzle 15 in the rocket motor case 11. The nozzle 15 is assembled before being inserted into the rocket motor case 11.

The assembled nozzle 15 is inserted into the head end of the rocket motor case 11 and is forced into position through the aft opening 14, and any well-known retaining and/or sealing means can be used, but are not illustrated. Such means may constitute a split ring which will sustain handling loads and eliminate mis-match applying stress to the propellant. The aft insulation 28 is coated with a potting compound 29, inserted through the head end, and forced into position in the truncated conical portion 13—sealing and holding the nozzle 15 in position. The rest of the self-restraining nozzle 10 which includes insulation 32 and shell or covering 33 or 34 may be attached either before or after casting and curing the grain. In the event that the rocket motor case 11 is provided with a central opening 14 of sufficient diameter to permit the outlet end of the exhaust portion to extend therethrough, the self-restraining nozzle 10 may be prefabricated as a single unit before its insertion into the rocket motor case 11.

The solid propellant charge 12 is cast and finished in two sections—the main section filling the aft end of the rocket motor case 11 and a separate head end segment, not shown. Segments of the solid propellant charge 12 are a prefect match, when the solid propellant rocket motor has been completed.

It is believed that from the foregoing description the specific structure and the manner of assembly of the present invention will be apparent to those skilled in the art, and it is to be understood that minor changes in the details of construction, arrangement and combination of parts may be resorted to provided they fall within the spirit of the invention and the scope of the appended claim.

Having thus described the invention what is claimed as new and desired to be secured by Letters Patent is:

A self-restraining nozzle for a solid propellant rocket motor case comprising a body of substantially hour-glass formation including a motor case receiving section, an exhaust portion receiving section and an intermediate throat receiving section interposed between said motor case receiving section and said exhaust portion receiving section with all of said sections joined integrally with each other to provide a unitary assembly, said motor case having a truncated conical portion at the aft end thereof; said conical portion having a central opening therein through which said body is inserted so that the motor case receiving section of said body will conform to and have contact with the inner surface of said conical portion, a throat insert positioned in said throat-receiving section, said throat insert having a cylindrical outer surface, a curved inner surface and side faces that are oriented at obtuse angles to said cylindrical outer surface, an annular aligning shoulder on the external surface of said motor case receiving section engaging the peripheral edge of the central opening in said motor case to properly position said nozzle in said motor case, insulation means forming a diverging nozzle portion and conforming at its forward end with the shape of said exhaust portion receiving section and the aft face of said insert, means securing the forward part of said insulation means in said exhaust portion receiving section so that a part of said insulation means extends aft therefrom, an outer shell comprising strands of glass rovings wound onto said insulation means, said insulation means having an annular shoulder on the outer peripheral edge of its aft end for retaining the shell in place, said shell extending forward over the external surface of said exhaust portion receving means to assist in securing said insulation means thereto, and a second insulation means conforming to the forward face of said throat insert, to the inner surface of said motor case receiving section and to a portion of the inner surface of said motor case, said second insulation means being bonded to said last mentioned section and said motor case portion to form a rigid joint therebetween.

References Cited by the Examiner
UNITED STATES PATENTS

| | | | |
|---|---|---|---|
| 2,426,526 | 8/1947 | Rutishauser et al. | 60—35.6 |
| 2,500,334 | 3/1950 | Zucrow | 60—35.6 |
| 2,699,036 | 1/1955 | Nicholson | 60—35.6 |
| 2,835,107 | 5/1958 | Ward | 60—35.6 |
| 2,849,860 | 9/1958 | Lowe | 60—35.6 |
| 2,862,447 | 12/1958 | Lyon | 60—35.6 |
| 2,987,880 | 6/1961 | Kimmel | 60—35.6 |
| 2,995,011 | 8/1961 | Kimmel | 60—35.6 |
| 3,001,363 | 9/1961 | Thibodaux et al. | 60—35.6 |
| 3,011,309 | 12/1961 | Carter | 60—35.6 |
| 3,032,982 | 5/1962 | Gaubatz | 60—35.6 |
| 3,044,256 | 7/1962 | Bayly et al. | 60—35.6 |
| 3,048,970 | 8/1962 | Herzog | 60—35.6 |
| 3,066,822 | 12/1962 | Watter | 60—35.6 |
| 3,142,960 | 8/1964 | Bluck | 60—35.6 |

OTHER REFERENCES

Aerospace Engineering Publication, May 1960 (pp. 117, 118, 120).

Astrolite, H. I. Thompson Fiber Glass Co., Products Bulletin No. PB7-24A, July 1, 1959, pp. 1–4 relied on.

MARK NEWMAN, *Primary Examiner.*

SAMUEL LEVINE, *Examiner.*

C. R. CROYLE, *Assistant Examiner.*